INVENTOR.
WILLIAM W. SHRADER
BY Leo R. Reynolds
AGENT

United States Patent Office 3,220,002
Patented Nov. 23, 1965

3,220,002
MOVING AND FIXED TARGET PULSED
RADAR RECEIVING SYSTEM
William W. Shrader, Waltham, Mass., assignor to Raytheon Company, Lexington 73, Mass., a corporation of Delaware
Filed Sept. 11, 1963, Ser. No. 308,150
8 Claims. (Cl. 343—7.7)

The present invention relates to a pulsed radar receiving system, and more particularly to a signal processing arrangement for the receiver of such a system wherein radar echoes from distributed targets or "clutter" are eliminated, while echoes from targets moving with respect to surrounding clutter and also echoes from point targets in the clear (whether moving or fixed) are preserved for display.

The term "point targets in the clear" refers to targets, such as aircraft, which are of lesser dimension (parallel to the direction from the radar station to the target) than the increment of range which is equal to the range resolution of the radar system, and which moreover are so free from surrounding targets as to produce the only echo within that increment which includes the point target in question. The term "point targets in clutter" refers to point targets, such as aircraft, surrounded by distributed targets or "clutter," these distributed targets being spaced in range from each other and from the point target in question by less than the range resolution of the radar. Clutter may be produced by radar returns from terrain, or from weather fronts, or from multiple radar reflectors ("chaff") intended to create spurious radar echoes.

At the present time, several types of pulsed radar systems are capable of detecting targets which are moving with respect to surrounding clutter. One well-known moving target indicator (MTI) system commonly referred to as "coherent MTI" is capable of detecting moving targets whether they are in clutter or in the clear. In this type of system, all fixed target returns are eliminated. A second well-known type of MTI system, commonly referred to as "non-coherent MTI," is capable of detecting moving targets in clutter. However, radar systems utilizing non-coherent MTI are incapable of detecting any targets outside of clutter (in the clear) unless provisions are also made in such systems for gating in normal non-MTI radar in the absence of clutter. In this latter case, all targets in the clear, both fixed and moving, are detected without distinction in the absence of clutter.

Briefly stated, each of the prior art pulsed moving target indicator (MTI) radar systems mentioned above distinguishes moving objects or targets from stationary targets in the following manner. Reference signals are provided which are fixed in phase with respect to the phase of each pulse transmitted by the radar system. These reference signals may be produced by an oscillator in the radar system itself (coherent MTI), or they may consist of echo pulses received from stationary targets (non-coherent MTI).

Each pulse transmitted by the radar system usually illuminates a plurality of targets from which echo pulses are reflected. The echo pulses are compared with the reference signal and the difference in terms of phase is detected to produce a video pulse. Echoes of successive pulses from a given stationary target have the same fixed phase relationship with respect to the reference signal and are represented by individual video pulses which have a fixed amplitude. On the other hand, echoes of successive pulses from a given moving target are received at different times (ranges) with respect to the respective successive transmitted pulses. These successive echoes therefore vary in phase with respect to the reference signal. Hence, the successive moving target echoes are represented by individual video pulses which vary in amplitude from pulse to pulse. A moving target cancellation system arranged to compare successive video pulses produced by processing echoes from a given target distinguishes between successive identical video pulses (fixed taregts) and successive varying video pulses (moving targets). Fixed target echoes are cancelled in the cancellation system while moving target echoes are not.

According to the present invention, means are provided whereby echo pulses from distributed targets provide phase reference signals for comparison with the echoes from targets which are moving with respect to nearby distributed targets. Means are also provided whereby noise is utilized to produce a random phase reference signal for comparison with echoes from targets in the clear. Furthermore, a pulse-to-pulse cancellation circuit is provided to compare phase difference signals produced by the above-mentioned means at corresponding times during two successive pulse repetition periods. In the cancellation circuit, signals representative of echoes from distributed clutter are eliminated (cancelled) while signals which are representative of point targets, such as aircraft which are adjacent to, but moving with respect to, distributed targets, are preserved for display. The system has sub-clutter visibility making it possible to detect moving point targets which are considerably weaker than surrounding clutter. The system is also capable of detecting all point targets in the clear independent of the velocity of such point targets.

The system has advantages for both commercial and military applications since it eliminates distributed targets such as weather, ground return and chaff even where such targets are moving slowly (e.g., less than 100 m.p.h.) in a radial direction with respect to the radar system. Particularly, the system is capable of eliminating different types of clutter moving at different low radial velocities on the same azimuth if the different types of clutter are at different ranges. This latter feature is particularly useful either in an airborne radar where clutter radial velocity depends on range or in a ground based radar where it is desired to remove ground clutter at short ranges and clutter such as wind-blown chaff or weather at longer ranges.

The invention will now be further described with reference to the accompanying drawing in which.

Figure 1:
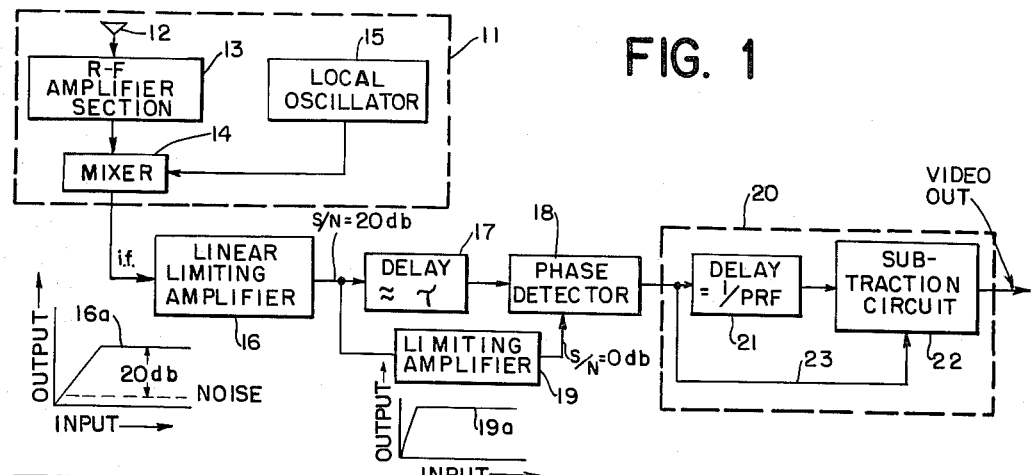
FIG. 1 is a schematic diagram of a pulse radar receiving system incorporating a first embodiment of the invention.

Referring now to FIG. 1 of the drawing, a pulsed radar receiving system embodying the present invention comprises a conventional radar receiver "front end" indicated generally by reference character 11. The receiver front end 11 typically comprises a receiving antenna 12, a high frequency (R.-F.) amplifier section 13 for amplifying received signals, a signal mixer 14 and a local oscillator 15. The latter two elements (14 and 15) serve to reduce the frequency of received signals to an intermediate frequency (I.-F.) lower than the received high radio frequency (R.-F.).

The radar receiving system further comprises first and second signal channels coupled to front end 11. The first signal channel comprises a linear-limiting amplifier 16 having a transfer characteristic (output vs. input) as shown at 16a. Linear-limiting amplifier 16 produces an output directly proportional to its input for all inputs up to an input level corresponding to the "knee" of the transfer characteristic 16a. All inputs above the knee input level produce equal outputs (i.e., such outputs are "limited" in magnitude). This knee input level is advantageously selected such that substantially all echoes received from actual targets such as aircraft which are at ranges up to the maximum design range of the system are amplified to the output "limit level" corresponding to the horizontal portion of characteristic 16a. The first signal channel further comprises a conventional delay line 17 coupled to linear-limiting amplifier 16. Delay line 17 is arranged to retard or delay signals for a time interval of between one and two times the width (timed duration τ) of the pulses of high frequency energy transmitted by the radar transmitting system (not shown) associated with the radar receiving system of FIG. 1. As will be explained in the description of the operation of the system of FIG. 1, it is advantageous to utilize a delay line 17 having a delay equal to the width (τ) of the transmitted pulses. The output of delay line 17 is coupled to one input of a phase detector 18 which may, for example, be a conventional balanced phase detector of the type described in chapter 21, volume 23 of the Radiation Laboratory Series published by McGraw-Hill. The bandwidth of detector 18 may advantageously be equal to twice the reciprocal of the width of the transmitted pulse signals.

The second signal channel coupled to front end 11 comprises linear-limiting amplifier 16 and a limiting amplifier 19 coupled to the output of linear-limiting amplifier 16. The transfer characteristic of limiting amplifier 19 is shown at 19a in FIG. 1. The shape of characteristic 19a below the knee or limiting input level is shown as a straight line. However, the shape of this initial portion of characteristic 19a is of no significance to the invention since the knee of characteristic 19a occurs at an input level equal to the average noise level at the output of amplifier 16a. Thus, limiting amplifier 19 is arranged to produce equal magnitude outputs for all inputs, whether they be "signals" or "noises," greater than the average noise level input to limiting amplifier 19. Amplifier 19 therefore produces a substantially constant level ouptut at all times.

The output of limiting amplifier 19 is coupled to the second input of phased detector 18 to complete the second signal channel. Phase detector 18 is arranged to compare the phases of the two input signals and to produce a video output signal representative of their phase difference.

The video output produced by phase detector 18 is coupled to a conventional MTI cancellation circuit 20. Cancellation circuit 20 comprises a delay line 21 arranged to delay signals for a time interval equal to the repetition period of the pulses of high frequency energy produced by the radar transmitting system associated with the receiver of FIG. 1. The output of delay line 21 is coupled to one input of a video subtraction circuit 22. The output of phase detector 18 is also coupled directly to a second input of subtraction circuit 22 by coupling means 23. The video output of subtraction circuit 22 is coupled to a conventional radar display system such as a cathode ray tube (not shown).

In operation, the radar transmitter (not shown) associated with the receiving system of FIG. 1 periodically radiates a short burst or pulse of high frequency energy. Each pulse may, for example, have a duration (width) (τ) of 2 microseconds (μsec.). Each 2 μsec. pulse typically comprises several thousand cycles of a high frequency wave (the number of cycles being dependent upon the transmitter operating frequency). Furthermore, the 2 μsec. pulses are repeated at intervals depending upon the desired maximum range which is to be investigated by the transmitter-receiver combination. For example, electromagnetic energy travels approximately one mile in 5.35 microseconds. Since a pulse must travel from the transmitter to a target and back to the receiver, the echo from a target displaced one mile from the radar transmitter-receiver will arrive at the receiver approximately 10.7 microseconds after a pulse is radiated by the transmitter. Therefore, pulses may be transmitted at intervals of approximately 3000 microseconds where a range capability of 250 miles is desired.

The interval between the beginning of one pulse and the beginning of the next pulse produced by the transmitter will hereafter be referred to as the "pulse repetition period" or, in the alternative, as the reciprocal of the pulse repetition frequency (1/PRF).

Pulses radiated by the transmitter are reflected back to the receiver by radiation-reflective matter or objects lying along the path of travel of such pulses through space. The reflected or echo pulses are received by antenna 12 and amplified in R.-F. amplifier section 13. The amplified output of R.-F. amplifier section 13 is combined, in mixer 14, with a high frequency signal generated by local oscillator 15. The frequency of the signal generated by oscillator 15 is typically lower than the frequency of the transmitter. The R.-F. signal is converted in mixer 14 to an intermediate frequency (I.-F.) lower than the received radio frequency. Typically, this intermediate frequency may be in the range of 12 to 60 megacycles.

The output of mixer 14, under ordinary operating conditions, comprises a noise component and several distinct signal components. The noise component of the output of mixer 14 is produced as a result of noise generated and amplified within the front end 11 of the radar receiver. The signal components of the output of mixer 14 are representative of several distinct types of echo signals or target returns. The target returns may be classified as returns produced by distributed targets (or clutter) and returns produced by point targets. Each of these two categories or returns may be further divided into fixed and moving target returns. Target returns may therefore be considered as comprising four distinct categories: fixed and moving clutter returns and fixed and moving point target returns.

In the system of FIG. 1, wherein delay line 17 is arranged to delay signals for a time interval equal to the width of the transmitted pulses (i.e. 2 μsec.), point targets will be defined at targets which extend in range no further than a distance corresponding to the width of a single transmitted pulse (2 μsec. corresponds to approximately one-sixth mile of range).

The elements 16–21 of the system shown in FIG. 1 constitute a clutter eliminator by means of which video signals produced at the output of subtraction circuit 22 represent all point targets in the clear, whether moving or fixed, and all point targets which are moving with respect to adjacent clutter.

The situation will now be considered where returns or echoes are received from a point target such as an aircraft which is moving with respect to surrounding clutter such as chaff or weather.

It will be assumed that no target echoes are received by antenna 12 between the time at which a pulse is radiated by the transmitter and the time at which an echo is received from the portion of the clutter nearest to the transmitter (i.e. the leading edge of the clutter).

Immediately after the first pulse is radiated by the transmitter, noise travels through the receiver system of FIG. 1 and no useable output is produced. More specifically, noise generated at the output of mixer 14 passes through both linear-limiting amplifier 16 and limiting amplifier 19. The noise passing through limiting amplifier 19 is amplified to an output level corresponding to the horizontal portion of characteristic 19a. The noise passing through amplifier 16 is amplified to an output level, for example, 20 db below the horizontal portion of characteristic 16a. The horizontal portions of characteristics 16a and 19a are adjusted, with respect to each other, to provide equal "limit level" inputs to the two inputs of phase detector 18. Any attenuation introduced by delay line 17 must therefore either be balanced out by means of additional amplifiers or by adjusting the limit level of 16a higher than that of 19a. Therefore, where only noise passes through amplifiers 16 and 19, two noise signals, one substantially lower in amplitude than the other, are compared in phase detector 18 and a noise level output is produced.

When the echo from the leading edge of the clutter is received and applied to the input of linear-limiting amplifier 16, this echo is amplified in accordance with characteristic 16a to the level of, for example, 20 db above the average noise level at the output of amplifier 16. The 20 db level has been selected to provide a relatively good signal-to-noise ratio at the output of amplifier 16. Greater or lesser ratios may equally be utilized depending upon the desired quality of the output signal.

The output of amplifier 16 corresponding to the clutter echo is coupled to both delay line 17 and limiting amplifier 19. Since the signal output of amplifier 16 is 20 db above the noise level output thereof, the clutter echo input to amplifier 19 produces an output from amplifier 19 at a point on the horizontal portion of characteristic 19a. An amplified and limited signal corresponding to the clutter echo is therefore supplied to one input of phase detector 18.

At this time, the noise produced at the output of amplifier 16a two microseconds prior to the reception of the clutter echo is applied to the second input of phase detector 18. However, as mentioned earlier, this noise supplied via delay line 17 to one input of phase detector 18 is at a substantially lower level than the input supplied by amplifier 19 to phase detector 18. The first two microseconds of the clutter echo are therefore compared with low level noise in phase detector 18, producing a noise level output from phase detector 18.

Two microseconds later, the echo from the leading edge of the clutter is applied via delay line 17 to phase detector 18. By this time, the echo from the clutter which is approximately one-sixth of a mile behind the leading edge is applied to phase detector 18 by amplifier 19. The two echoes from adjacent range increments of clutter are compared in phase detector 18, producing a video output signal representative of the phase difference between the two clutter echoes.

The output of phase detector 18 produced upon such a comparison of echoes from adjacent clutter is a video signal, the absolute magnitude of which is of no significance to this invention. However, as will be pointed out below, the pulse-to-pulse variation of this output, if any, makes it possible to distinguish desired echoes from undesired echoes.

Subsequent echoes from the clutter at different ranges are received and such echoes are compared in phase detector 18 with echoes received one pulse width later. That is, the phases of echoes from adjacent elements of clutter are compared with each other in phase detector 18. Echoes from point targets within the clutter, whether such point targets are fixed or moving, are also compared with echoes from elements of clutter adjacent to such point targets in a similar manner. At this stage of signal processing, the system does not differentiate between clutter and fixed and moving targets within the clutter.

All echoes received in response to the first transmitted pulse are similarly received and processed. The resulting video output signals produced by phase detector 18 are supplied to cancelling circuit 20. In cancelling circuit 20, the output of phase detector 18 is delayed for one repetition period by means of delay line 21. While these video signals produced as a result of the first transmitted pulse are circulating through delay line 21, a second pulse is transmitted by the transmitting system. Echoes produced in response to the second transmitted pulse are processed in the manner explained above and further video output signals are produced by phase detector 18.

These latter video output signals are coupled by coupling means 23 to one input of substraction circuit 22. At this time, the delayed video signals, originally produced one pulse repetition period earlier (e.g. 3000 $\mu$sec.), are applied to the second input of subtraction circuit 22. The amplitudes of the video signals produced during one pulse repetition period are then compared with the amplitudes of video signals produced at corresponding times in the succeeding pulse repetition period by means of subtraction circuit 22.

If any target moves with respect to an adjacent target during the period between the reception of an echo of a first transmitted pulse and the reception of an echo of the next succeeding transmitted pulse, the phase difference between the echo from the moving target and the echo from the adjacent relatively fixed target will change from pulse to pulse. In such a case, the output of phase detector 18 at a given time after the transmission of a first pulse will differ from the output thereof produced at the corresponding time after the transmission of the next succeeding pulse. Such unequal outputs produced by phase detector 18 are compared in subtraction circuit 22, producing a video output signal representative of a target which has moved with respect to an adjacent relatively stationary target or clutter. Two adjacent targets which remain in the same relative position with respect to each other between transmitted pulses produce equal outputs from phase detector 18 in response to successive transmitted pulses. Such equal outputs produced by phase detector 18 are representative of clutter and cancel each other in subtraction circuit 22 (i.e. no output from subtraction circuit 22).

A special case will now be considered with respect to the echo received from the trailing edge of clutter (i.e. that segment of the clutter which is at the greatest range from the radar transmitter-receiver). As is the case with echoes from other segments of distributed targets, the echo from the trailing edge of the clutter passes through limiting amplifier 19 and is compared in phase detector 18 with the echo from an adjacent less distance segment of the clutter to produce a video phase-difference signal output. However, a different situation exists two microseconds later when the echo from the trailing edge of the clutter which has passed through delay line 17 is applied to one which has passed through delay line 17 is applied to one input of phase detector 18. By this time all other clutter echoes have passed through limiting amplifier 19. The input to limiting amplifier 19 is, under these circumstances, a noise input. The noise, in accordance with characteristic 19a of amplifier 19, is amplified to a level corresponding to the horizontal portion of characteristic 19a. Therefore the noise input supplied by amplifier 19 and the delayed clutter echo input supplied by delay line 17 to phase detector 18 are equal in amplitude. The phase of the noise supplied by amplifier 19 varies in a random manner and, hence, a randomly varying output is produced by phase detector 18. The rate at which this randomly varying output varies is, of course, limited by the bandwidth of phase detector 18. As noted earlier, this bandwidth may advantageously be equal to twice the reciprocal of the transmitted pulse width (i.e., equal to one megacycle per second for a 2 $\mu$sec. pulse). This echo from the clutter trailing edge will be compared with noise during each pulse repetition period. Since the phase of the noise with respect to that of the clutter echo will vary in a random manner from one transmitted pulse to the next, the output of phase detector 18 representative of the clutter trailing edge will also vary in a random manner on a pulse-to-pulse basis. A video output representative of this echo from the clutter trailing edge will therefore be produced at the output of subtraction circuit 22.

In a similar manner, any other target, not immediately preceded in range by (i.e. within one-sixth mile of) another target which is relatively fixed with respect to the first-mentioned target, results in the production of a video output from subtraction circuit 22. Thus echoes from all point targets in the clear, whether such targets are fixed or moving with respect to the radar system, result in the production of a video output from circuit 22. This result follows from the fact that limiting amplifier 19 is arranged to produce a high level noise reference signal whenever there are no target echoes present at the input of limiting amplifier 19. This noise reference signal serves as a random phase reference which makes it possible to produce video output signals from phase detector 18 which vary from one transmitted pulse to the next for any point target in the clear. This pulse-to-pulse variation of the output of phase detector 18 for point targets in the clear results in the production of a video signal at the output of subtraction circuit 22 for such targets.

It should be noted that the time delay of delay line 17 determines the upper size limit of "point targets" displayed by the system. Furthermore, this time delay determines how wide a portion of the trailing edge of distributed clutter will be displayed, in accordance with the discussion above. Finally, by keeping the magnitude of this time delay to a value close to the transmitted pulse width, the echo from a given range increment of a distributed target is compared with the echo from a nearby range increment of the same distributed target. In this way, even if, for example, the radar system is airborne and the radial velocity of distributed targets varies as a function of the range of such targets from the radar, the velocity change between adjacent increments of a distributed target will be so small that such targets will be cancelled. Therefore, a time delay of two microseconds has been chosen for delay line 17.

Figure 2:
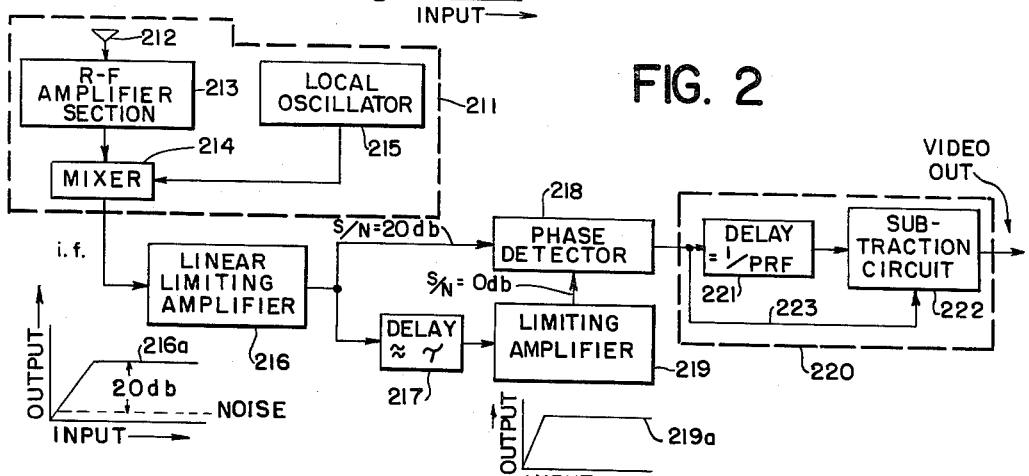
FIG. 2 is a schematic diagram of a pulsed radar receiving system incorporating a second embodiment of the invention.

Referring now to FIG. 2 of the drawing, a second embodiment of this invention in a pulsed radar receiving system is shown. Elements in FIG. 2 which have the same function as elements in FIG. 1 are indicated by the same reference numeral as the corresponding elements in FIG. 1 preceded by the addition of the digit 2.

It can readily be seen from a comparison of FIGS. 1 and 2 that the two systems comprise the same functional elements. However, in the FIG. 2 embodiment, delay line 217 is coupled between the output of linear-limiting amplifier 216 and the input of limiting amplifier 219. This change in the location of delay line 217 with respect to the location of delay line 17 in FIG. 1 results in one operational difference between the FIG. 1 and FIG. 2 embodiments.

Specifically, in the FIG. 2 embodiment, location of delay line 217 in series with limiting amplifier 219 results in the production of a video output signal at the output of subtraction circuit 222 corresponding to the leading edge of clutter (i.e. that portion nearest to the radar system). The trailing edge of clutter, unlike the result obtained with the FIG. 1 embodiment, is cancelled at the video level in the FIG. 2 embodiment. These results are produced in the following manner.

At the time that the I.-F. signal representative of the first echo pulse from the clutter leading edge is supplied by linear-limiting amplifier 216 to one input of phase detector 218, a limited noise output is supplied by limiting amplifier 219 to the second input of phase detector 218. The output limit levels of amplifier 216 and 219 are, in this case, made substantially equal to each other. Hence, two equal level inputs, one representative of the echo from the clutter leading edge and the other a random noise input, are supplied to phase detector 218. A video output signal representative of the phase difference between these inputs is produced at the output of phase detector 218. Similarly, a video output signal will be produced at the output of phase detector 218 as a result of the comparison of the random phase of noise with the phase of the echo from the clutter leading edge of the next succeeding transmitted pulse. Successive echoes from the clutter leading edge therefore result in the production of varying level video output signals from phase detector 218. Such varying pulse-to-pulse video output signals are not cancelled in cancellation circuit 220 and a video output is passed to the display system.

The echo from the trailing edge of clutter is eliminated in the FIG. 2 embodiment since, when the delayed echo from the clutter trailing edge is supplied via amplifier 219, low level noise is supplied via amplifier 216. A noise level output is produced by phase detector 218 in this case.

The FIG. 2 embodiment may advantageously be used where it is desirable, for example, to display the leading edge of a weather system and all aircraft which are behind (i.e. with respect to the radar system) the weather.

In the FIG. 2 embodiment, it may be said that the phase detector 218 produces an output representative of the difference between the phase of the echo from a given target and the phase of the echo from the adjacent nearer (with respect to the radar system) target. In the case of targets in the clear, of course, the echo from the "nearer target" does not exist and a noise reference is utilized in phase detector 218 for detection of targets in the clear in the same manner as in the FIG. 1 embodiment.

In contrast, in the FIG. 1 embodiment, the phase comparison is made in phase detector 18 between the echo from a given target and the echo from the adjacent more distant target (with respect to the radar system). In all other respects except those discussed above, the FIG. 1 and FIG. 2 embodiments are similar.

Figure 3:
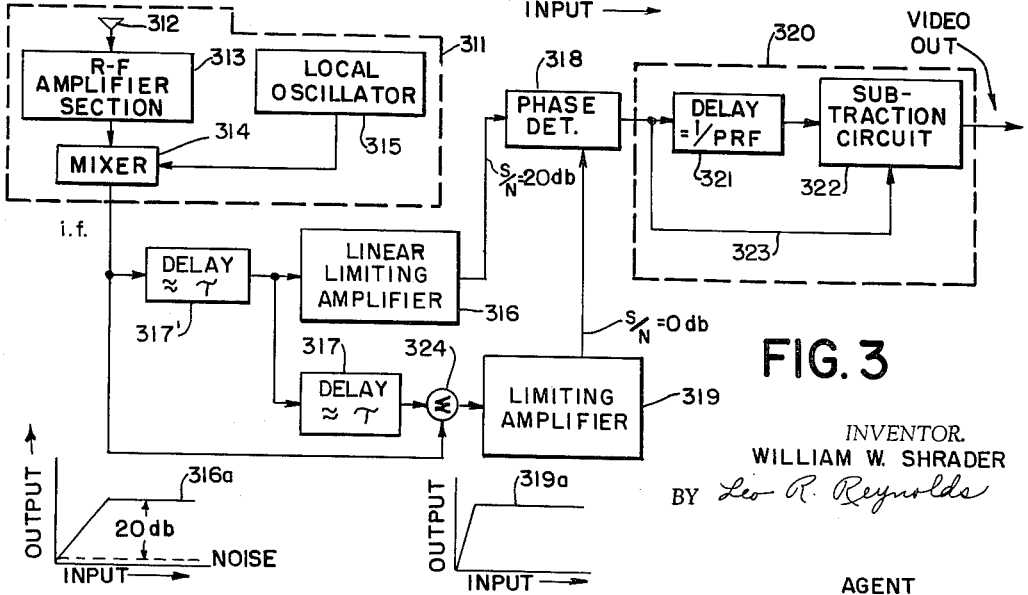
FIG. 3 is a schematic diagram of a pulsed radar receiving system incorporating a third embodiment of the invention.

In the FIG. 3 embodiment, elements which are functionally similar to elements shown in FIG. 1 are designated by the same reference numerals as the corresponding elements in FIG. 1, preceded by the addition of the digit 3.

By comparing FIG. 3 with FIGS. 1 and 2, it can readily be seen that all elements shown in FIGS. 1 and 2 are included in FIG. 3. However, in the FIG. 3 embodiment, the output of signal mixer 314 is coupled to a first delay line 317' as well as to one input of a signal summing circuit 324, neither of which are included in the FIG. 1 and FIG. 2 embodiments. Signal summing circuit 324 may be a conventional summing circuit such as a resistive network.

The output of delay line 317' is coupled both to the input of linear-limiting amplifier 316 and to the input of a delay line 317. The output of delay line 317 is, in turn, coupled to the second input of signal summing circuit 324. Delay line 317 and delay line 317' are each arranged to delay signals for a time interval substantially equal to the width (2$\mu$sec.) of the transmitted pulses. The output of signal summing circuit 324 is coupled to the input of limiting amplifier 319.

The additional delay line 317' and signal summing circuit 324 are included in the FIG. 3 embodiment to provide means whereby echoes from both the leading and trailing edges of clutter are eliminated while echoes from point targets which are moving with respect to surrounding clutter and echoes from all point targets in the clear are preserved for display. Thus, in the FIG. 3 embodiment, the phase of the echo from a given target is compared with the phase of the sum of the signals, whether they represent echoes or noise, produced at the output of mixer 314 one pulse length (2$\mu$sec.) before and one pulse length after the echo from the given target appears at the output of mixer 314.

The operation of the FIG. 3 embodiment will be considered where returns or echoes are received from a distributed target or clutter which surrounds a moving point target such as an aircraft.

Immediately after a first pulse is radiated by the transmitter associated with the FIG. 3 receiving system, low-level noise generated within the receiving system passes through the various elements thereof and produces a noise level output from phase detector 318. When the echo from the leading edge of the cutter is received at antenna 312, it is converted by means of front end 311 to an intermediate frequency signal. The I.-F. echo signal is applied directly to one input of summing circuit 324. At this time, the second input to summing circuit 324 and the output of linear-limiting amplifier 316 are low-level noise. The output of summing circuit 324 is therefore substantially equal to the high level echo signal. This echo signal is amplified in limiting amplifier 319 to the limit level of that amplifier. The amplified and limited echo signal is then supplied to one input of phase detector 318. The second input to phase detector 318 is, at this time, low-level noise supplied by amplifier 316. In this situation, a low-level noise output is produced by phase detector 318.

During the next succeeding two microsecond interval, the echo of the first transmitted pulse from the segment of the clutter approximately one-sixth mile behind the leading edge thereof is supplied, in a similar manner, to summing circuit 324. The second input to summing circuit 324 is still a noise-level input. The resulting echo signal output of circuit 324 is amplified in amplifier 319 to the limit output level thereof and the amplified and limited echo signal is supplied to one input of phase detector 318. At the same time, the earlier received echo signal from the clutter leading edge which has passed through delay line 317' is amplified to the limit level of amplifier 316. The amplified and limited clutter leading edge echo signal is supplied to the second input of phase detector 318.

In the FIG. 3 embodiment, since amplifiers 316 and 319 supply their respective output signals directly to phase detector 318, the limit output levels of these two amplifiers are made substantially equal to each other. Therefore, two equal amplitude signals are compared in phase detector 318 and a video output signal, representative of the phase difference between the two echo signals is produced at the output of phase detector 318.

During the next succeeding two microsecond time interval, the echo of the first transmitted pulse from the segment of the clutter approximately one-third mile behind the clutter leading edge is supplied directly to one input of summing circuit 324. The echo pulse from the clutter leading edge, delayed for four microseconds by delay lines 317' and 317 in series, is supplied at this time to the second input of summing circuit 324. The output of summing circuit 324 is supplied to limiting amplifier 319 while the echo pulse from the clutter approximately one-sixth mile behind the clutter leading edge is supplied to linear-limiting amplifier 316. The two amplified and limited output signals produced by amplifiers 316 and 319 are compared in phase detector 318 and an output signal, representative of the phase difference between one echo signal and the sum of echo signal "in front of" and "behind" the one echo signal is produced.

This process continues for all clutter echoes, as well as any point targets within the clutter. When the echo from the clutter trailing edge is received, it is first utilized to provide a sum reference signal, along with the echo from the clutter approximately one-third mile in front of the trailing edge, in summing circuit 324. The clutter trailing edge echo itself next passes through delay line 317' and amplifier 316 to be compared with the echo from the adjacent preceding portion of the clutter in phase detector 318. Finally, the echo from the clutter trailing edge pases through delay lines 317' and 317, summing circuit 324 and amplifier 319 to be compared with low-level noise, supplied by amplifier 316, in phase detector 318. This last comparison produces an noise level output.

In response to the next succeeding transmitted pulse, echoes are received and processed in the same manner as described above. The video outputs produced by phase detector 318 in response to the comparison of echoes of the first transmitted pulse are compared with video outputs thereof produced one pulse repetition period later in response to the comparison of echoes of the second transmitted pulse by means of cancelling circuit 320. This circuit operates in the same manner as explained above in connection with cancelling circuit 20. In the present case, the phase of each echo is compared with the phase of the sum of the echoes before and after the echo in question. If all three echoes remain fixed in phase with respect to each other (i.e. the targets remain stationary with respect to each other) from one transmitted pulse to the next, the corresponding video outputs from phase detector 318 will be equal and will be cancelled in cancelling circuit 320. However, if one of any three adjacent targets moves with respect to the other two, video outputs from phase detector 318 corresponding to the phase difference between the echoes from these three targets will vary from transmitted pulse to transmitted pulse. These echoes from targets moving with respect to surrounding clutter will not be cancelled in cancelling circuit 320 but will be preserved for display.

It should be recalled that the phase of the echo from the leading edge of the clutter was compared with the phase of the echo from the next succeeding portion of the clutter. Furthermore, the phase of the echo from the trailing edge of the clutter was compared with the phase of the echo from the next preceding portion of the clutter. The outputs of phase detector 318 corresponding to these two comparisons will not vary from one transmitted pulse to the next if these adjacent portions of clutter are substantially stationary with respect to each other. Therefore, the echoes from both the leading and trailing edges of clutter will be cancelled in the FIG. 3 embodiment.

Point targets in the clear are processed in the following manner. The echo from a point target in the clear is initially supplied directly to one input summing circuit 324, added to the noise-level output of delay line 317, amplified to the limit level of amplifier 319 and compared with low level noise in phase detector 318. A noise level output is produced. During the next two microsecond interval, the noise behind and in front of the echo from the point target is summed in summing circuit 324, amplified to the limit level of amplifier 319 and supplied to one input of phase detector 318. The echo from the point target, delayed for two microseconds by delay line 317', is amplified to the limit level of amplifier 316 and supplied to the second input of phase detector 318. Phase detector 318 produces a video output signal representative of the phase difference between the echo from the point target and the random noise reference. This output will vary from one transmitted pulse to the next since the random noise will vary from one pulse to the next. Therefore, the echo from the point target in the clear will not be cancelled in cancelling circuit 320 but, rather, will be preserved for display.

Finally, the echo from the point target in the clear, delayed four microseconds by delay lines 317' and 317, is amplified by amplifier 319 and compared with the noise-level output of amplifier 316 in phase detector 318. A noise-level output is produced by phase detector 318.

The FIG. 3 embodiment of the invention therefore provides a system wherein targets moving with respect to surrounding clutter and all point targets in the clear are preserved for display.

While the invention has been described in terms of three specific embodiments, it is not limited thereto. Furthermore, various modifications, such as coupling the limiting amplifier directly to the output of the signal mixer in the FIG. 1 and FIG. 2 embodiments may be made without departing from the full scope of the invention. The invention itself, in its various aspects, is set forth in the appended claims.

I claim:

1. A pulsed radar receiving system for use in cooperation with a pulsed radar transmitting system, the latter being arranged to transmit pulses of high frequency energy of predetermined time duration at a predetermined pulse repetition frequency, said receiving system comprising means for receiving pulse signal echoes produced by the reflection of transmitted pulse signals from radiation-reflective matter, a first signal channel coupled to said receiving means comprising first amplifying means for producing output signals substantially proportional to input signals supplied thereto at input signal levels up to a limiting input signal level substantially greater than the noise input level to said first amplifying means and for producing limited substantially constant magnitude output signals in response to all input signals equal to or greater than said limiting input signal level, said receiving system further comprising a second signal channel coupled to said receiving means comprising second amplifying means for producing limited substantially constant magnitude output signals in response to all input signals supplied thereto which are equal to or greater than the noise input level to said second amplifying means, one of said signal channels further comprising means for delaying signals for a time period substantially less than the repetition period of the transmitted pulses from which said pulse signal echoes are derived, said receiving system further comprising means coupled to said first and second signal channels for detecting phase differences between output signals produced by said first signal channel and output signals produced by said second signal channel, said receiving system further comprising signal subtraction means having first and second input terminals, means for coupling the output of said phase detecting means directly to said first input terminal of said signal subtraction means and means for delaying the output of said phase detecting means for a period equal to the repetition period of the transmitted pulses, the output of said last mentioned delaying means being coupled to said second input terminal of said signal subtraction means.

2. A pulsed radar receiving system in accordance with claim 1 wherein the output limit level of said first amplifying means and the output limit level of said second amplifying means are so related that two substantially equal magnitude signals are supplied to said means for detecting phase differences when the outputs of both said first and second amplifying means are driven to the output limit levels thereof.

3. A pulsed radar receiving system for use in cooperation with a pulsed radar transmitting system, the latter being arranged to transmit pulses of high frequency energy of predetermined time duration at a predetermined pulse repetition frequency, said receiving system comprising means for receiving pulse signal echoes produced by the reflection of transmitted pulse signals from radiation-reflective objects, first amplifying means coupled to said receiving means for producing output signals substantially proportional to input signals supplied thereto over a range of input signal levels up to a limiting input signal level substantially greater than the noise input level to said first amplifying means and for producing limited substantially constant magnitude output signals in response to all input signals equal to or greater than said limiting input signal level, said receiving system further comprising second amplifying means coupled to said receiving means for receiving signals from said first amplifying means and producing limited substantially constant magnitude output signals in response to all input signals supplied thereto equal to or greater than the average noise level input to said second amplifying means, said receiving system further comprising a first delay line coupled to said first amplifying means, said first delay line providing a signal delay substantially equal to the time duration of one of the transmitted pulses from which said pulse signal echoes are derived, a phase detector having first and second input terminals, the first input terminal thereof being coupled to said first delay line and the second input terminal thereof being coupled to said second amplifying means, for detecting the phase differences between signals supplied to said first and second input terminals by said first delay line and said second amplifying means respectively, said receiving system further comprising signal subtraction means having first and second input terminals, means for coupling the output of said phase detector directly to said first input terminal of said subtraction means, and a second delay line coupled to said phase detector for delaying the output of said phase detector for a period equal to the repetition period of the transmitted pulses, the output of said second delay line being coupled to said second input terminal of said subtraction means.

4. A pulsed radar receiving system for use in cooperation with a pulsed radar transmitting system, the latter being arranged to transmit pulses of high frequency energy of predetermined time duration at a predetermined pulse repetition frequency, said receiving system comprising means for receiving pulse signal echoes produced by the reflection of transmitted pulse signals from radiation-reflective objects, first amplifying means coupled to said receiving means for producing output signals substantially proportional to input signals supplied thereto over a range of input signal levels up to a limiting input signal level substantially greater than the noise input level to said first amplifying means and for producing limited substantially constant magnitude output signals in response to all input signals equal to or greater than said limiting input signal level, said receiving system furthr comprising second amplifying means coupled to said receiving means for receiving signals from said first amplifying means and producing limited substantially constant magnitude output signals in response to all input signals supplied thereto equal to or greater than the average noise level input to said second amplifying means, said receiving system further comprising a first delay line coupled to said second amplifying means, said first delay line providing a signal delay substantially equal to the time duration of one of the transmitted pulses from which said pulse signal echoes are derived, a phase detector having first and second input terminals, the first input terminal thereof being coupled to said first amplifying means and the second input terminal thereof being coupled to said second amplifying means, for detecting the phase differences between signals supplied to said first and second input terminals by said first and said second amplifying means respectively, said receiving system further comprising signal subtraction means having first and second input terminals, means for coupling the output of said phase detector directly to said first input terminal of said subtraction means, and a second delay line coupled to said phase detector for delaying the output of said phase detector for a period equal to the repetition period of the transmitted pulses, the output of said second delay line being coupled to said second input terminal of said subtraction means.

5. A pulsed radar receiving system for use in cooperation with a pulsed radar transmitting system, the latter being arranged to transmit pulses of high frequency energy of predetermined duration at a predetermined pulse repetition frequency, said receiving system comprising means for receiving pulse signal echoes, first means coupled to said receiving means for delaying signals for a time period substantially equal to the time duration of one of said transmitted pulses, first amplifying means coupled to said first signal delay means for producing output signals substantially proportional to input signals supplied thereto at input signal levels up to a limiting input signal level substantially greater than the average noise input level to said first amplifying means and for producing limited substantially constant magnitude output signals in response to all input signals supplied thereto which are equal to or greater than said limiting input signal level, said receiving system further comprising second means coupled to said first signal delaying means for delaying signals for a time period substantially equal to the time duration of one of said transmitted pulses, a signal summing circuit having first and second input terminals, the first input terminal thereof being coupled to said receiving means and the second input terminal thereof being coupled to said second signal delaying means, second amplifying means coupled to said signal summing circuit for producing limited substantially constant magnitude output signals in response to all input signals supplied thereto equal to or greater than the average noise level input to said second amplifying means, the limited substantially constant magnitude output of said second amplifying means being substantially equal to the limited substantially constant magnitude maximum output of said first amplifying means, said receiving system further comprising a phase detector having first and second input terminals, the first input terminal thereof being coupled to said first amplifying means and the second input terminal thereof being coupled to said second amplifying means, for detecting the phase differences between signals supplied to said first and second input terminals by said first and said second amplifying means respectively, said receiving system further comprising signal subtraction means having first and second input terminals, means for coupling the output of said phase detector directly to said first input terminal of said subtraction means, and a second delay line coupled to said phase detector for delaying the output of said phase detector for a period equal to the repetition period of the transmitted pulses, the output of said second delay line being coupled to said second input terminal of said subtraction means.

6. A pulsed radar receiving system for use in cooperation with a pulsed radar transmitting system, the latter being arranged to transmit pulses of high frequency energy of predetermined time duration at a predetermined pulse repetition frequency, said receiving system comprising means for receiving pulse signal echoes, means coupled to said receiving means for delaying signals for two pulse widths, means coupled to said receiving means for delaying signals for one pulse width, signal summing means having a first input terminal coupled to said two pulse width delaying means and having a second input terminal coupled to said receiving means, linear-limiting amplifying means coupled to said one pulse width delaying means for providing substantially constant gain for all input signals supplied thereto which are of lesser magnitude than a limiting input level and for providing limited constant magnitude output signals in response to all input signals supplied thereto which are equal to or greater than said limiting input level, the limiting input level being substantially greater than the average noise input level to said linear-limiting amplifying means, said receiving system further comprising limiting amplifying means coupled to the output of said signal summing means for providing limited constant magnitude output signals in response to all input signals supplied thereto which are equal to or greater than the average noise level input to said limiting amplifying means, the limited constant magnitude output signals provided by said limiting amplifying means being substantially equal in magnitude to the limited constant magnitude output signals provided by said linear-limiting amplifying means, said receiving system further comprising a phase detector having a first input terminal coupled to the output of said linear-limiting amplifying means and a second input terminal coupled to the output of said limiting amplifying means, said phase detector being arranged to produce video output signals representative of the phase differences between signals applied to said first and second input terminals thereof, said receiving system further comprising signal subtraction means having first and second input terminals, means for coupling the output of said phase detector directly to said first input terminal of said subtraction means, and a second delay line coupled to said phase detector for delaying the output of said phase detector for a period equal to the repetition period of the transmitted pulses, the output of said second delay line being coupled to said second input terminal of said subtraction means.

7. In combination: transmitter means for illuminating objects with pulses of energy; receiver means for receiving energy reflected from said illuminated objects; a first limiter means for deriving phase reference signals from said received energy; a second limiter means for receiving signals from said first limiter means and deriving random phase reference signals from noise in the absence of received energy; means for time delaying the phase reference signals derived by one of said limiter means a predetermined amount; and phase detector means for providing a signal proportional to the phase difference between the delayed and undelayed reference signals.

8. In combination: transmitter means for illuminating objects with pulses of energy; receiver means for receiving energy reflected from said illuminated objects; a first limiter means for deriving phase reference signals from said received energy; a second limiter means for receiving signals from said first limiter means and deriving random phase reference signals from noise in the absence of received energy; means for time delaying the phase reference signals derived by one of said limiter means a predetermined amount; phase detector means for providing a signal proportional to the phase difference between the delayed and undelayed reference signals; and cancellor means comprising means for time delaying the phase detector means signals a period proportional to the repetition period of said transmitter means and means for subtracting the time delayed phase detector signals from undelayed phase detector means signals.

References Cited by the Examiner
UNITED STATES PATENTS 3,026,514  3/1962  Hance _____ 343—7.7

CHESTER L. JUSTUS, *Primary Examiner.*